United States Patent
Payton et al.

[19]

[11] Patent Number: 6,041,542
[45] Date of Patent: Mar. 28, 2000

[54] SPILL-RESISTANT LIQUID BAIT STATION

[75] Inventors: Charles H. Payton, Brentwood; T. James Gibson, Mountain View; William T. Cress, Campbell, all of Calif.

[73] Assignee: A-Pro Pest Control, Inc., Campbell, Calif.

[21] Appl. No.: 09/327,931

[22] Filed: Jun. 8, 1999

Related U.S. Application Data

[63] Continuation-in-part of application No. 09/012,531, Jan. 23, 1998, Pat. No. 5,966,863.

[51] Int. Cl.$^7$ .................................................. A01M 25/00
[52] U.S. Cl. ................................................................ 43/131
[58] Field of Search ................................. 43/131, 132.1, 43/107, 124

[56] References Cited

U.S. PATENT DOCUMENTS

| | | | |
|---|---|---|---|
| D. 289,315 | 4/1987 | Baker et al. | D22/119 |
| D. 329,681 | 9/1992 | Demarest et al. | D22/122 |
| D. 358,629 | 5/1995 | Wefler | D22/122 |
| 794,323 | 7/1905 | Small . | |
| 1,309,606 | 7/1919 | Bartholomew . | |
| 1,700,517 | 1/1929 | Ross . | |
| 1,964,611 | 6/1934 | Watson | 43/131 |
| 2,632,280 | 3/1953 | Heim | 43/131 |
| 2,896,362 | 7/1959 | Wingate | 43/131 |
| 3,017,717 | 1/1962 | Caubre | 43/131 |
| 4,026,064 | 5/1977 | Baker | 43/131 |
| 4,208,829 | 6/1980 | Manning | 43/131 |
| 4,550,525 | 11/1985 | Baker et al. | 43/131 |
| 4,660,320 | 4/1987 | Baker et al. | 43/131 |
| 5,033,229 | 7/1991 | Demarest et al. | 43/131 |
| 5,038,516 | 8/1991 | Doucette | 43/131 |
| 5,040,327 | 8/1991 | Stack et al. | 43/131 |
| 5,136,803 | 8/1992 | Sykes et al. | 43/131 |
| 5,152,097 | 10/1992 | Rhodes | 43/132.1 |
| 5,272,832 | 12/1993 | Marshall et al. | 43/131 |
| 5,406,743 | 4/1995 | McSherry et al. | 43/122 |
| 5,448,852 | 9/1995 | Spragins et al. | 43/131 |
| 5,467,738 | 11/1995 | Cass | 119/61 |
| 5,501,033 | 3/1996 | Wefler | 43/131 |
| 5,540,011 | 7/1996 | Groom et al. | 43/122 |
| 5,548,922 | 8/1996 | Wafler | 43/131 |
| 5,577,461 | 11/1996 | Sebastian et al. | 119/51.5 |
| 5,870,853 | 2/1999 | Williams | 43/131 |
| 5,873,193 | 2/1999 | Jensen | 43/131 |
| 5,875,586 | 3/1999 | Ballard et al. | 43/131 |
| 5,896,697 | 4/1999 | Kang | 43/133 |
| 5,966,863 | 10/1999 | Payton et al. | 43/131 |

FOREIGN PATENT DOCUMENTS

| | | |
|---|---|---|
| 4-335851 | 11/1992 | Japan . |
| WO98/25454 | 6/1998 | WIPO . |

OTHER PUBLICATIONS

J.T. Eaton & Co. Inc., brochure entitled #903TP & #904 Tamper–Resistant Bait Station, Bait Holder Rod Installation Instructions, 1996.

J.T. Eaton & Co. Inc., brochure entitled "#910 Tamper–Resistant Bait Station, Bait Holder Rod Installation Instructions", 1996.

*Primary Examiner*—Thomas Price
*Attorney, Agent, or Firm*—Thomas Schneck; David M. Schneck

[57] ABSTRACT

A bait station providing a holder for dispensing liquid bait in a refillable manner. The liquid bait is kept in a reservoir at the bottom of the bait station base. Fit into an open end of the base is an interior section comprised of two domes. The interior section fits into the base above the bait reservoir. A lid is secured over the end of the base. The dimensions of the domes are selected such that the domes contain the liquid bait if inverted and one dome contains the liquid bait held in half the reservoir. The access ports at the top of the base and between the domes provide access to the liquid bait. Refilling the station with liquid poison is effected either through a port in the lid of the bait station or by removal of the lid. Target insects enter the bait station through one or more access ports and then travel through an interior passageway to the liquid bait, which can be both an attractant and a poison.

34 Claims, 7 Drawing Sheets

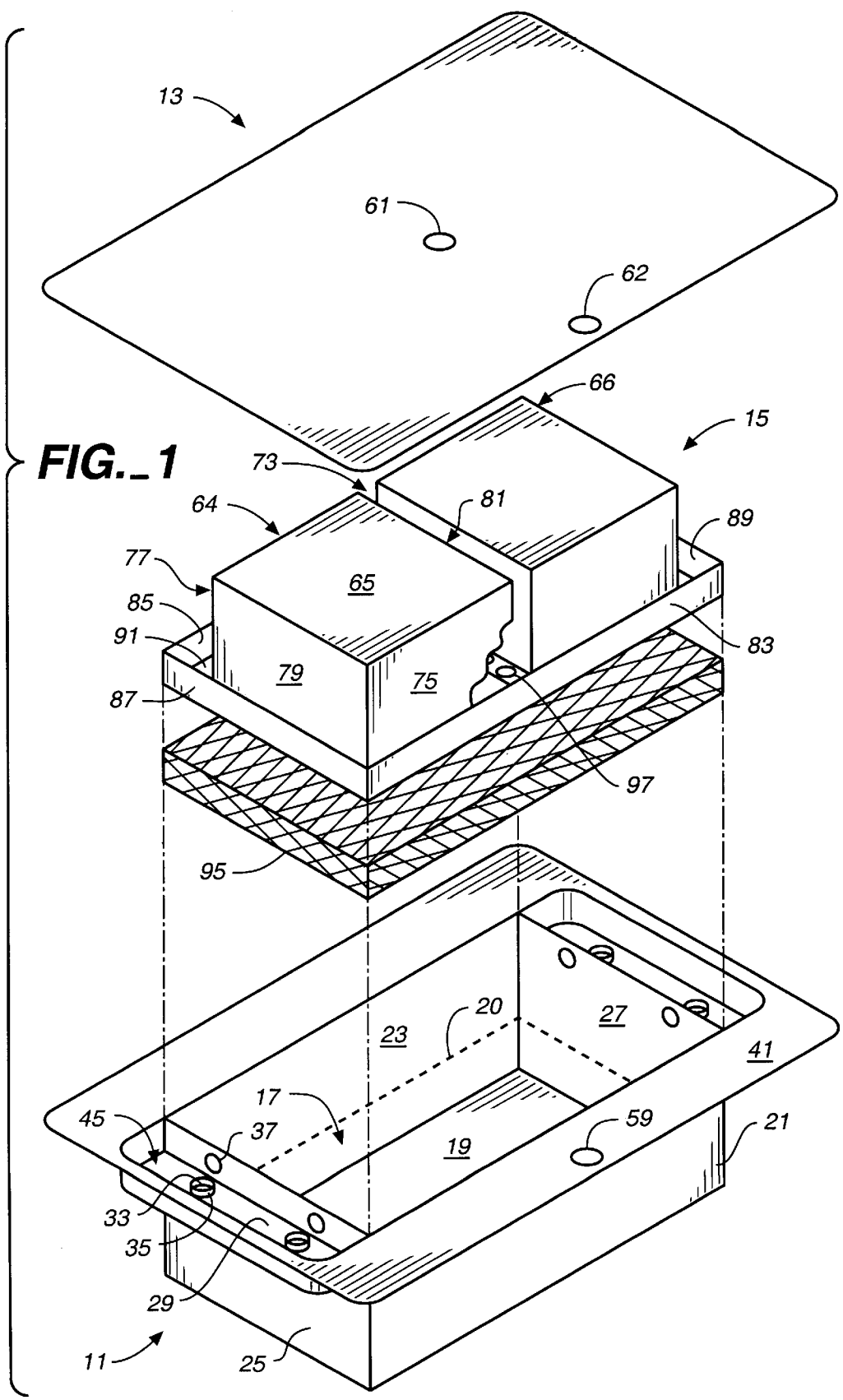
FIG._1

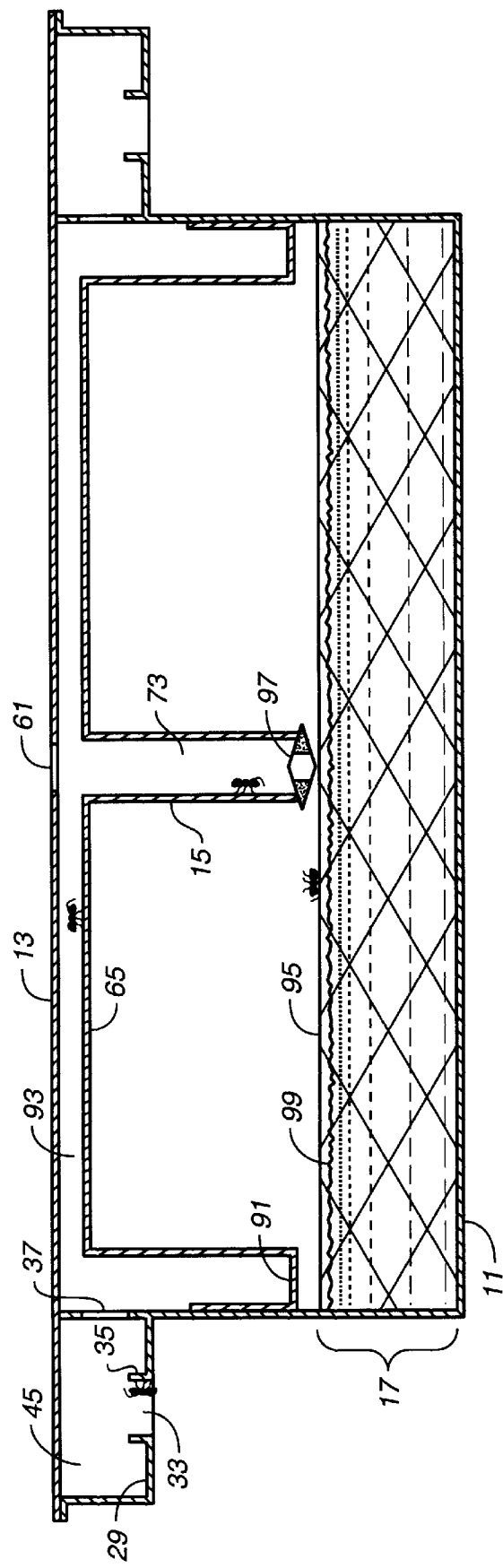
FIG._2

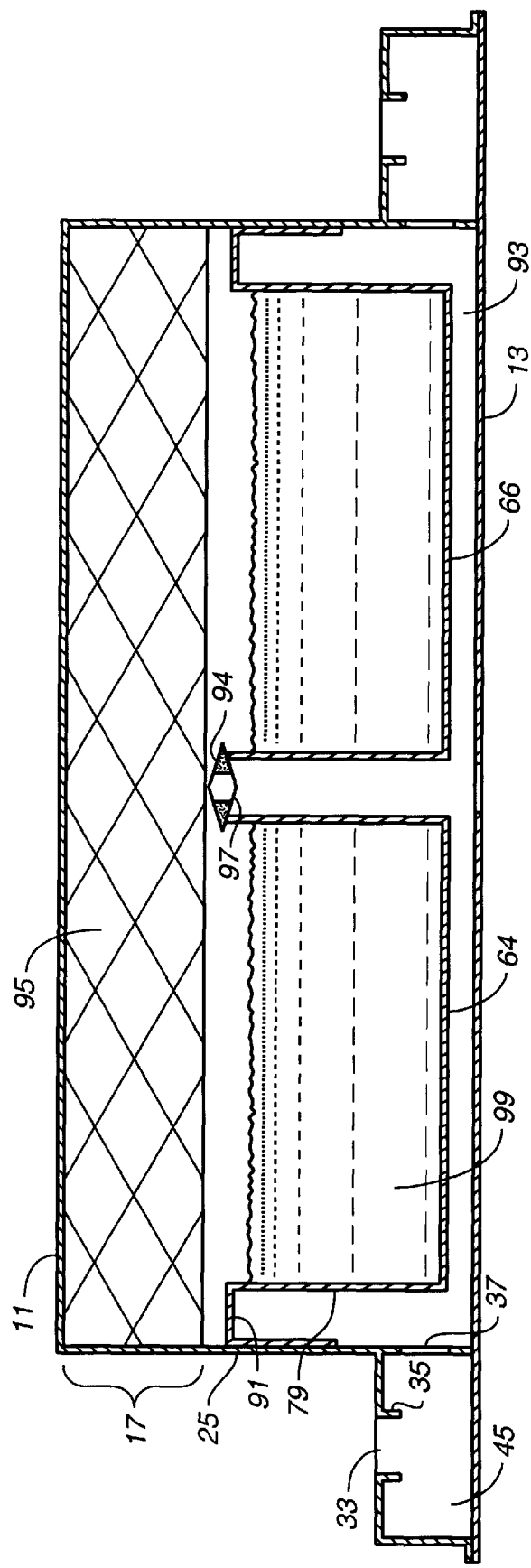
FIG._3

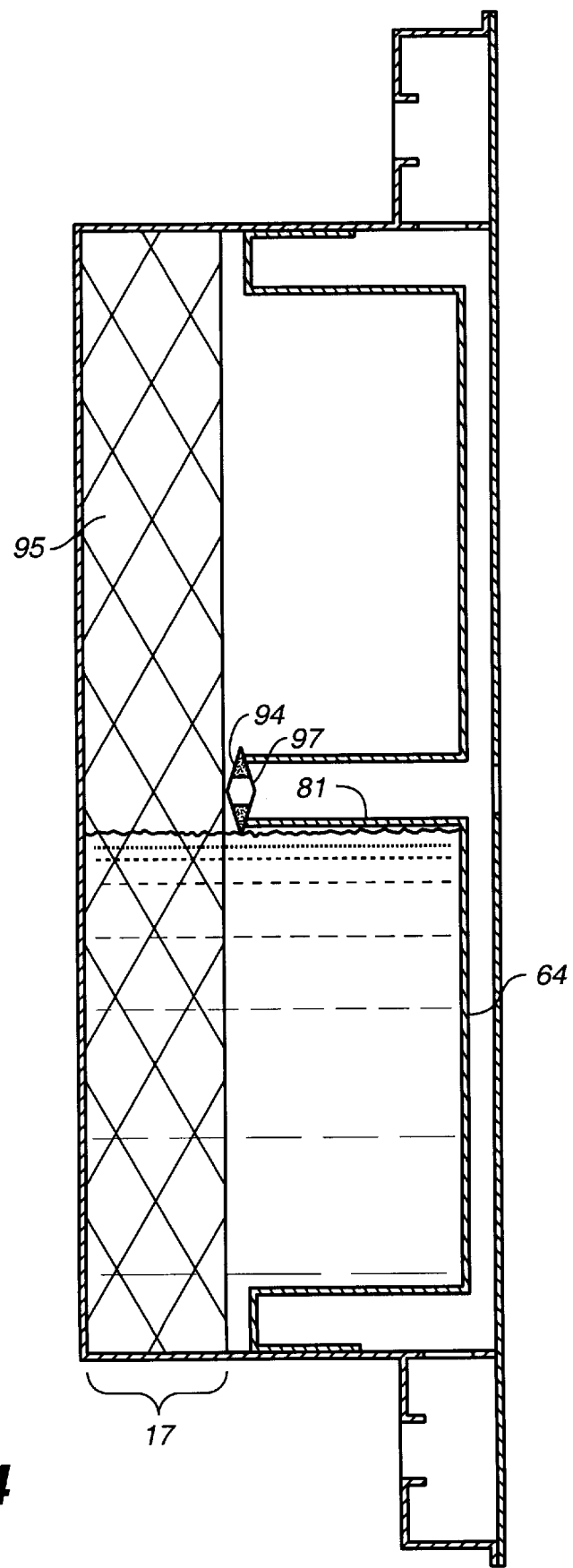
FIG._4

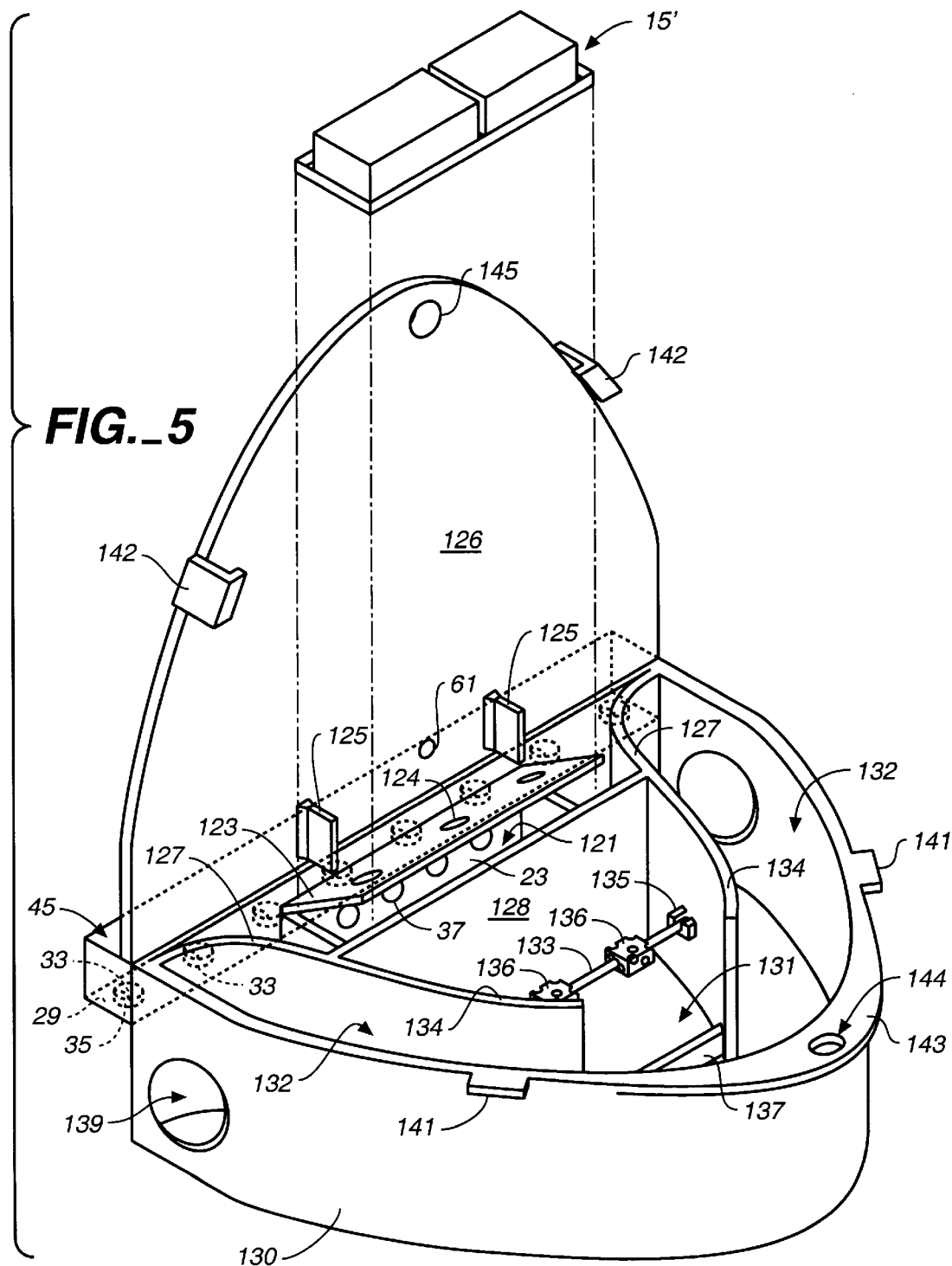
FIG._5

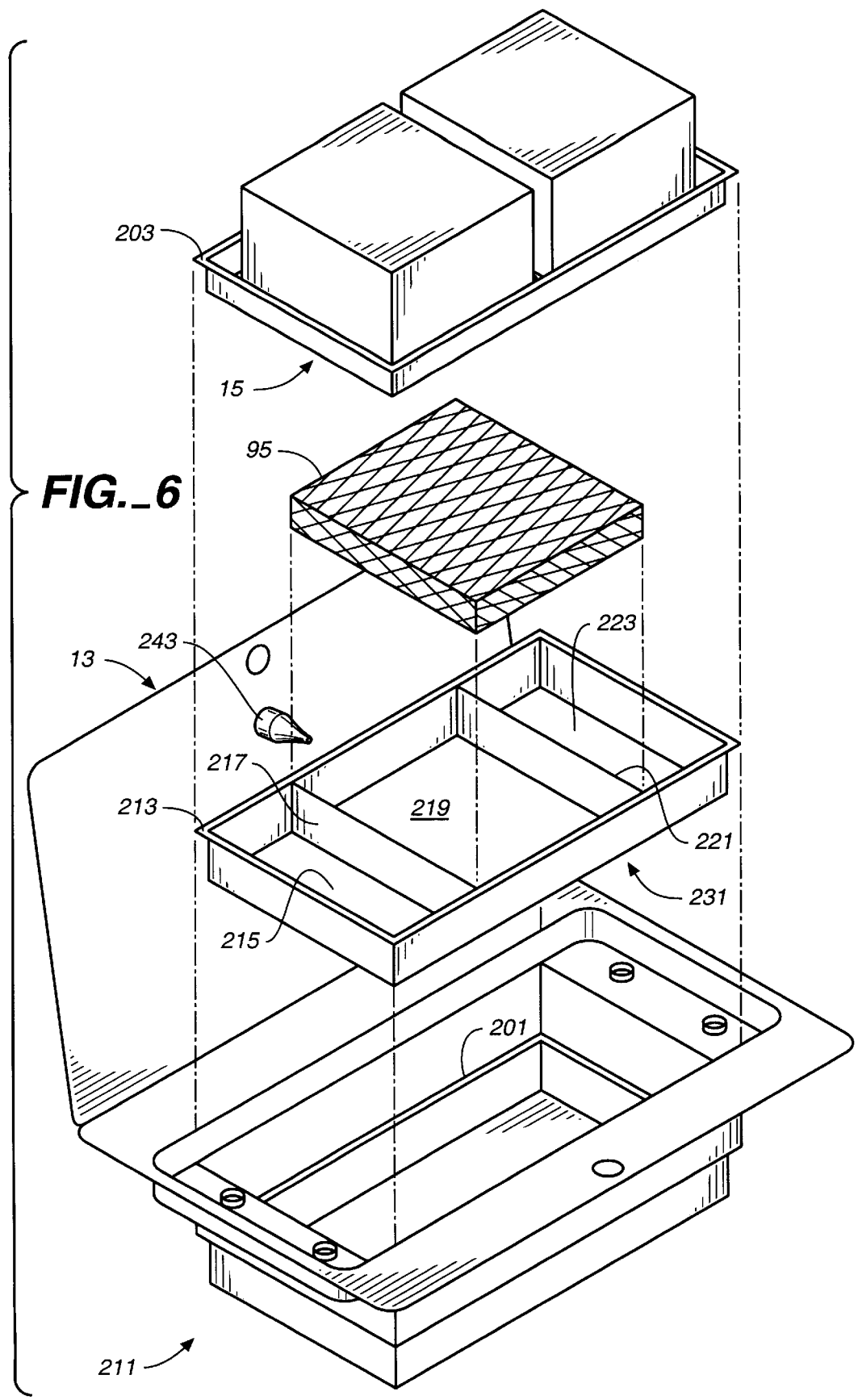

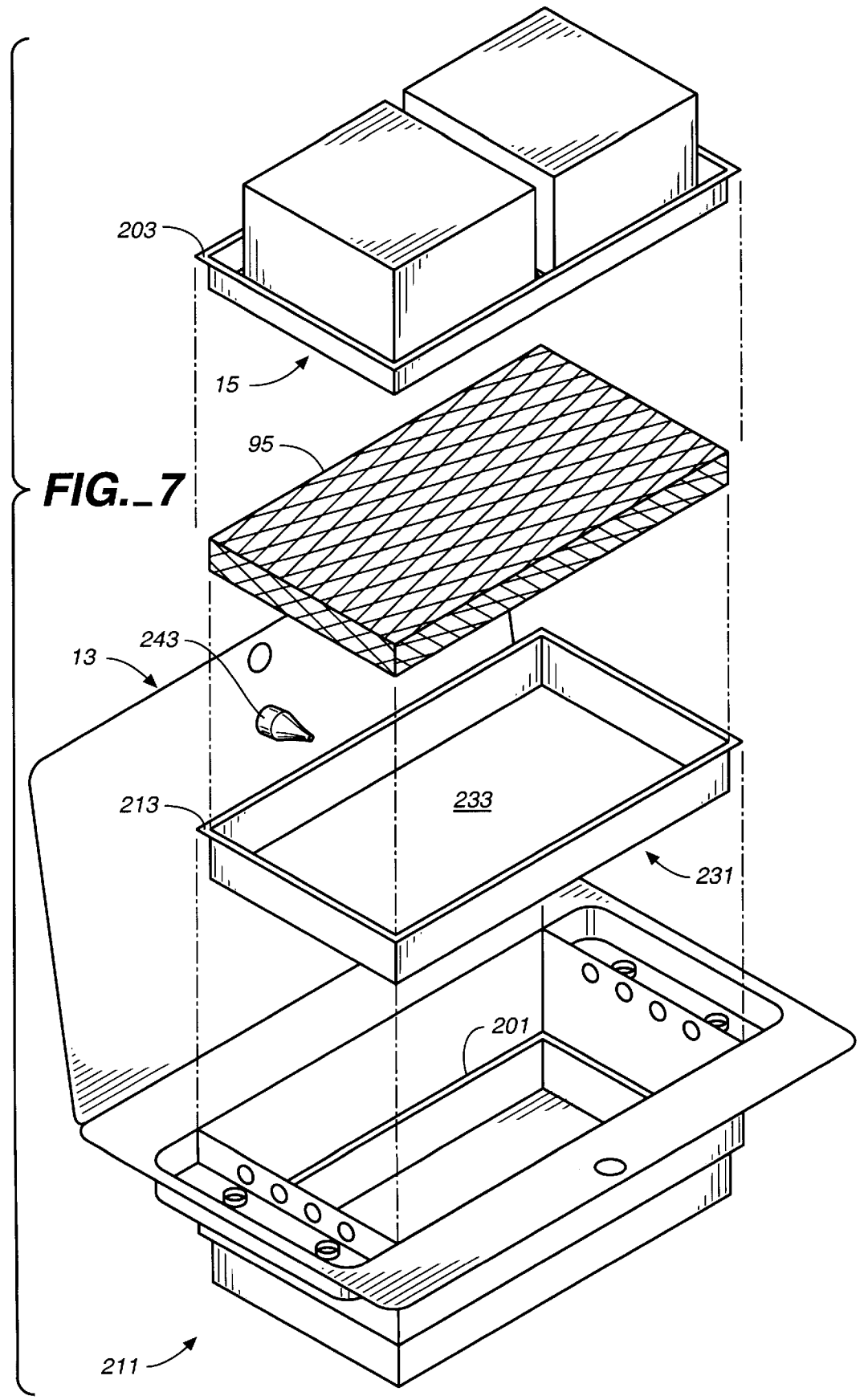

SPILL-RESISTANT LIQUID BAIT STATION

CROSS-REFERENCE TO RELATED APPLICATION

This application is a continuation-in-part of application Ser. No. 09/012,531 filed Jan. 23, 1998 for "Liquid Bait Station for Ants and Combined Ant/Rodent Station" now U.S. Pat. No. 5,966,863.

TECHNICAL FIELD

The present invention relates to insect bait stations. Particularly, the invention relates to insect liquid bait stations resistant to spills or leaks.

BACKGROUND ART

Numerous insects are recognized as harmful to human health and responsible for causing economic damage. Control of these insects is thus necessary. To control insects liquid poison is often used. The spraying of such poisons has numerous risks including possible poisoning of humans. In addition, sprayed liquid poison often degrades in the environment or is washed away reducing the effectiveness of the poison and requiring greater amounts of applications to reduce insect population. For these reasons it is often preferred to contain liquid poison in bait stations where the poison would be contained and the insect would have access to the poison.

Numerous bait stations have been described in the art. U.S. Pat. No. 1,964,611 to Watson describes a bait station with a circular trench enclosed within a bait housing the circular trench containing liquid poison. A lip on the trench provides some protection against spillage of the liquid poison. Holes within the housing allow insects to enter. U.S. Pat. No. 3,017,717 to Caubre describes a housing into which a bottle of liquid poison can be inserted. The bottle is inserted into the housing such that an open end of the bottle containing liquid poison faces a hole within the housing. The holes allow insects to enter and the insects may then enter the bottle of liquid poison. The housing is secured by screws to affix the housing into a set orientation such that the open liquid bottle of poison does not spill.

Numerous bait stations have used bases for containing liquid poison. U.S. Pat. No. 5,033,229 to Demarest et al. describes a bait station in which a porous material is inserted into a base. Attached onto the base and positioned over the porous material and in liquid contact with the porous material is a reservoir which can be filled with liquid poison. A top is secured over the reservoir to prevent spillage of the liquid poison from the reservoir. A similar bait station is described in U.S. Pat. No. 5,548,922 to Wefler. This patent describes an insect bait station which also has a base containing a porous material filled with a liquid poison. A top cover is inserted over this base to enclose the liquid material. The top cover has a number of holes for insect entry. U.S. Pat. No. 5,406,743 to McSherry et al. describes an insect trap in which a liquid poison is contained in a container sealed by a lid. One or more tubes extend through the walls of the container. The tubes are positioned such that they are below the lid of the container and above the bottom of the level of the liquid poison contained within the container. The one or more tubes allow insect entry. U.S. Pat. No. 5,873,193 to Jensen describes an insect bait station secured by a stake which is driven into the ground. The insect bait station has an internal reservoir. The insects gain access to the interior reservoir by means of passageways extending into the interior of this reservoir. This insect bait station has a removable top allowing the bait station to be refilled with liquid poison.

Bait stations containing liquid poison, while safer than aerial spraying, do present some hazards from possible spillage. If the liquid bait station is inverted or turned on its side, it is possible that the liquid poison would spill out. Humans or animals could then contact the spilled liquid poison presenting a health hazard. This is of special concern for children who could possibly come into contact with a bait station and invert or turn the bait station on its side without realizing the potential hazards.

PCT filing no. WO9825454 to Hyatt et al. describes a liquid poison bait station with spill resistant features. In this bait station an internal reservoir contains liquid poison. A somewhat porous material is adjacent to the liquid poison. The porous material allows some of the poison to wick through. Openings in the bait station's housing allow ants or other insects access to the porous material. U.S. Pat. No. 5,870,853 to Williams describes a sealable bait station. In this bait station, a reservoir is mounted on a plate. The plate is then driven into the ground. Perforations through the pipe allow insect access. The insects then travel up the pipe to access holes positioned near the top of the pipe. The reservoir is an annular container surrounding the pipe. A cap encloses the top of the reservoir. The cap is removably attached to the top of the pipe allowing the top to be secured to the pole. The top can be removed to allow the reservoir to be refilled. U.S. Pat. No. 5,875,586 to Ballard et al. describes another refillable bait station with some safety features. In this insect bait station the exterior housing of the bait station encloses a peripherally offset reservoir containing poison liquid bait. The labyrinth of interior walls provides containment to prevent spilling. Holes at the top of the housing allow the bait station to be refilled with liquid bait. The labyrinth of interior walls limits the amount of liquid bait that can be used in the bait station without risk of spillage.

The object of the present invention is to disclose a spill-resistant liquid bait station for the control of insects. This liquid bait station should be simple to manufacture and adaptable to be refilled and reused. It should be of simple construction and made of inexpensive material.

It is a further object of the invention to provide multiple spill containment features while at the same time allowing maximal volume of liquid poison to be contained within the bait station to minimize the frequency that the bait station must be refilled.

SUMMARY OF THE INVENTION

The above objects are achieved through an improved bait station comprised of a reservoir containing a base section, an interior divider fitted within the base section, and a lid fit onto the open top of the base section. The base section includes an insect entry chamber positioned on the base near the open top. One or more holes in the insect entry chamber allow insects entry into the base. The interior divider is shaped such that the interior divider has two domes. The interior divider fits within the base above the level at which liquid poison is contained. Between the two domes on the interior divider is one or more holes for allowing insect entry. The interior divider is securely inserted into the base such that a liquid tight seal is formed. The volume of each dome is sufficient to contain slightly more than half of the liquid poison contained in the base reservoir. With this construction, if the bait station is inverted the liquid poison contained in the reservoir of the station base can be completely contained within the two domes minimizing spillage. In a similar manner, if the bait station is turned on its side the volume of liquid poison that would flow from the reservoir when the bait station is turned on its side is contained within the dome. The positioning of the insect entry holes allows for further containment of liquid poison.

The lid of the bait station, if removable, allows the bait station to be refilled. Alternatively the bait station lid can be constructed with an entry port to allow refilling of the bait station with liquid poison.

BRIEF DESCRIPTION OF THE DRAWINGS

FIG. 1 is an exploded view of the liquid bait station in accord with the present invention.

FIG. 2 is a side cross sectional view of the liquid bait station shown in FIG. 1.

FIG. 3 is a view of the bait station cross section shown in FIG. 2 with the bait station inverted.

FIG. 4 is a view of the liquid bait station of FIG. 2 with the bait station shown tipped on its side.

FIG. 5 is a top perspective view of a multi-compartment bait station incorporating the spill resistant features shown in FIGS. 1–4.

FIG. 6 shows an exploded view of an alternate embodiment of the insect bait station of FIG. 1.

FIG. 7 shows an exploded view of a second alternate embodiment of the insect bait station of FIG. 1.

BEST MODE OF CARRYING OUT THE INVENTION

With reference to FIG. 1, an ant bait station of the present invention is seen. The bait station is constructed of three pieces: a station base 11, an interior divider 15, and a lid 13. In the embodiment shown in FIG. 1, the station base 11 is comprised of a base floor 19, a base front wall 21, a base rear wall 23, and base side walls 25 and 27. At the top of one or more walls of the base is an insect entry platform. Shown in FIG. 1 station base 11 has a base insect entry platform 29 extending from base side wall 25. Base insect entry platform 29 is constructed such that it forms an enclosed insect entry chamber 45. An exterior insect entry hole 33 allows insects to enter insect entry chamber 45. Interior insect entry hole 37 extending through the base side wall 25 allows insects entry into station base 11.

Interior divider 15 fits into base 11 such that the bottom of interior divider 15 forms a liquid tight seal along the walls of base 11. Interior divider 15 is positioned along the walls of station base 11 such that the bottom of interior divider 15 is removed from base floor 19 of station base 11. This space between interior divider 15 and the base floor 19 of station base 11 forms poison reservoir 17. The bottom of interior divider 15 is set at the liquid fill level 20. Matrix 95 is fit within poison reservoir 17. Matrix 95 may be composed of a porous material that is able to transfer liquid to the top surface of the matrix by wicking.

Interior divider 15 is comprised of two domes 64, 66. Domes 64, 66 are separated by gap 73. Dome 64 is comprised of a front dome wall 75, a back dome wall 77 and side dome walls 79, 81 extending from the bottom of interior divider 15. Dome 64 has a dome ceiling 65 positioned proximate to the open top of station base 11 when interior divider 15 is inserted into station base 11. In the preferred embodiment, surrounding domes 64, 66 is a peripheral trench. The trench is comprised of front trench wall 83, back trench wall 85, side trench walls 87, 89 and interior divider trench floor 91. The dimensions of the trench walls are constructed such that front trench wall 83, back trench wall 85, and side trench walls 87, 89 form a liquid tight seal with base front wall 21, base rear wall 23, and base side walls 25, 27. It is possible to manufacture the station base 11 such that the station base walls angle slightly such that the interior divider 15 is frictionally fit within base 11 and rests such that the bottom of interior divider 15 is at liquid fill level 20. Separating domes 64, 66 is a central gap 73. At the base of this gap at the bottom of interior divider 15 are insect entry holes 97.

Affixed on top of station base 11 once interior divider 15 and matrix 95 have been inserted therein is lid 13. It is preferred that station base 11 be constructed to have a base peripheral flare 41 at the open top of the base. Lid 13 can then rest on the base peripheral flare 41 and be secured thereto. If the bait station is to be disposable, the lid can be permanently secured by epoxy, ultrasonic welding, or other permanent attachment methods. Alternatively if the base is to be reusable, the lid can be secured on one side of base peripheral flare 41 by a hinge. Alternatively the lid 13 can be secured onto base peripheral flare 41 by tamper-proof clips, bolts, or other securing means known to those skilled in the art.

In one embodiment the lid 13 has a lid stake hole 62 which mates with a base stake hole 59 positioned on base peripheral flare 41. A stake may then be driven through lid stake 62 and container stake hole 59 and into the ground. By securing the bait station to the ground with a stake, further deterrent to tampering is effected.

Positioned centrally on lid 13 is refill port 61. Refill port 61 is positioned on lid 13 such that it is in alignment with the gap between domes 64, 66 and above one of holes 97. When additional liquid bait is to be added to the bait station, a filling device can be inserted in refill port 61 and extend through reservoir entry port 97 and onto matrix 95 in poison reservoir allowing reservoir 17 to be filled with liquid poison. A number of possible methods can be used to ensure that refill port 61 allows only entry and not exit of liquid poison. These include a rubber septum inserted into refill port 61. In addition, refill port 61 can be shaped such that spillage through the port is unlikely. A duck bill shape is one way of effecting this. Alternatively a removable plug or bolt can be inserted into refill port 61.

The station base 11, interior divider 15, and lid 13 can be easily made of injected molted plastic, for example, polystyrene or acrylonitrile-butydiene-styrene (ABS). Wall thickness should be at least 6 mils (150 micrometers) and typically is about 100 mils (2.5 millimeters). This allows optimal durability while still being inexpensive to produce. In production, interior divider 15 is inserted into station base 11 (which contains matrix 95) and either frictionally fit against the sloping walls of station base 11 or secured by ultrasonic welding, ultraviolet sealant, or epoxy. Lid 13 is then secured onto station base 11 by a similar means of securing if the lid is to be permanently secured or by the aforementioned removable attachment means.

It is possible to make station base 11 partially or totally from transparent material such as acrylic. By so constructing the base, the amount of liquid poison remaining in poison reservoir 17 can be visually inspected.

Matrix 95 contained within poison reservoir 17 can be made of a material designed to wick the liquid in the reservoir to a surface at the top of the matrix. A number of different matrix materials are adaptable to wick liquid poison to a surface. For example U.S. Pat. Nos. 4,323,193; 4,286,754; and 4,663,315 hereby expressly incorporated by reference herein, describe various wicking/eminator assemblies in which liquid held within a reservoir are drawn to a surface. U.S. Pat. No. 5,839,221 hereby incorporated by reference herein describes an insect bait station that utilizes a type of wicking material for delivery of liquid poison to a surface within the bait station. Numerous fibrous or polymeric porous materials would draw liquid to the surface. Sponges with small pores, capillaries, and lattice matrices of paper or polymers all draw liquid to a surface or act as a labyrinth which provides connecting passageways allowing insects to move to a liquid level. For example the paper matrices (bonded layer matrices) used as air filters are possibly adaptable to functioning as a wicking matrix. The matrix can be an intricate labyrinth which allows an insect to crawl to the area within the reservoir containing the liquid poison. The slit and expanded paper produced by Research Products Corp. and described in U.S. Pat. No. 5,207,020 hereby expressly incorporated by reference herein is adaptable for use as a labyrinth type matrix. Alternatively the matrix can wick the poison to an emanating surface. Either matrix type allows essentially all of the liquid poison to be accessible for consumption by the target insect.

It is possible to coat the matrix with antimicrobial agents to inhibit microbial growth. Many compounds, including esters of p-hydroxy benzoic acid, are known to inhibit microbial growth. This prevents the growth of fungus and extends the life of the bait station. Microbial growth inhibitors can either be included in the poison, coated onto the matrix, or coated onto the interior surfaces of the insect bait station.

In FIG. 2 a longitudinal section of the bait station is shown. In this view, interior divider 15 has been secured within base 11 above the reservoir 17 which contains matrix 95. Lid 13 is secured over base 11. Within reservoir 17 is a poison bait 99 which in addition to acting as an insecticide also functions as an attractant to attract insects into the trap. Numerous volatile compounds, such as insect pheromones, act as insect attractants.

The insect first enters into insect entry chamber 45 through exterior insect entry hole 33 on insect entry platform 29. Preferably hole 33 has an annular lip 35 over which the insect must crawl to be within insect entry chamber 45. The insect then crawls through interior insect entry hole 37. The insect will next crawl through insect passageway 93, a passageway formed by the space between dome ceiling 65 and lid 13. The distance between lid 13 and dome ceiling 65 is sufficient to allow passage of the insect. Alternatively, the insect could crawl along the walls of the dome or the trench bottom 91 to reach gap 73. Once the insect reaches gap 73, the insect is attracted by the bait to the bottom of the gap and through reservoir entry port 97. The insect then comes in contact with liquid bait 99 contained within matrix 95 which the insect consumes and then dies. Matrix 95 extends to within 1 centimeter of port 97 allowing insects to crawl or fall onto matrix 95. The bait can be selected to be most effective on the target insect.

Baits used for social insects are such that the dead insects are carried back to the nest and act as a poison for removing the entire colony. For example, ants use haploid female workers to provide food for the survival of the entire ant colony. A liquid poison would be gathered by the female worker and transported back to the colony. Feeding in an ant colony occurs by trophallaxis, a process whereby recipient ants or nymphs are fed by female worker ants. By utilizing a slow acting poison, the worker ants are able to transport the poison back to a colony, spreading the poison and eliminating greater number of ants. The queen is the only diploid, egg producing ant. Once the queen is eliminated no more eggs will be laid and the colony will die out. The matrix provides access of the insect to essentially all of the liquid contained within the reservoir, either by providing a pathway to the bottom of the reservoir or wicking the poison to the top of the reservoir. Through use of this matrix nearly the entire content within the reservoir may be consumed and transported by an ant or other insect.

The liquid poison 99 is held within reservoir 17. An absorbent matrix 95 of slightly smaller dimension than reservoir 17 can be fitted within reservoir 17 prior to the bait station assembly. The absorbent matrix 95 can be a sponge or other porous material which acts to both hold the liquid bait and help in wicking the liquid bait. The wicking of the liquid bait by absorbent matrix 95 ensures that poison will always be proximate to reservoir entry port 97 as long as there is poison within the reservoir. Alternatively the matrix can act as a labyrinth which an insect may crawl through to reach the level of the liquid poison.

To add additional liquid poison to reservoir 17 a refill probe is extended through refill port 61 down gap 73 and through reservoir entry port 97. At this location the liquid bait or poison can be applied directly onto absorbent matrix 95.

FIG. 3 shows the same section as FIG. 2 with the bait station inverted. As shown domes 64, 66 have sufficient dome volume to contain all of the liquid contained within reservoir 17 that has drained from matrix 95. The dome volume of domes 64, 66 is greater than the volume of reservoir 17 such that when the trap is inverted the level of liquid poison would be below reservoir entry port 97. Positioned over reservoir entry port 97 is liquid deflector 94. Liquid deflector 94 can be a liquid impermeable strip running below reservoir entry port 97 or can be a molded angled plastic protrusion or other means. The function of liquid deflector 94 is to ensure that liquid may pass into reservoir 17 but liquid is inhibited from passing from liquid reservoir 17 into gap 73.

Even if liquid does pass beyond liquid deflector 94 the liquid would still be contained on the bottom surface of lid 13. The interior insect entry hole 37 is positioned such that a section of the base side wall 25 of station base 11 will act as a lip providing secondary containment. When the insect bait station is returned to its upright orientation, any liquid contained within insect passageway 93 will flow between dome side wall 79 and base side wall 25 to interior divider trench floor 91. Interior divider trench floor 91 can be designed such that it angles to flow liquid around dome 64 and back into reservoir entry port 97. Any liquid which does manage to get into insect chamber 45 still must pass over entry hole annular lip 35 surrounding exterior entry hole 33 before the liquid would reach the exterior of the bait station. Annular lip 35 thus provides a third level of containment. These three levels of containment are provided in an insect bait station that is still of simple and durable construction and yet allows use of a large volume of liquid bait. For example, in an ant bait station if 12.25 fl. oz. of poison is used the period between refills is extended to 30 days. This greatly reduces the cost of ant elimination by significantly minimizing.

FIG. 4 illustrates the bait station shown in FIG. 2 with the bait station turned on its side. Dome 64 is of sufficient volume to contain the liquid poison displaced from reservoir 17 when the bait station is turned on its side. With the bait station on its side the dome volume is sufficiently large such that the level of liquid poison when the bait station is on its side is at or below dome side wall 81. As was shown in FIG. 3 any liquid that manages to pass through reservoir entry port 97 past liquid deflector 94 still has two levels of containment before it reaches outside of the trap.

FIGS. 1–4 show the insect bait station as used as an independent free-standing bait station. It is also possible to incorporate the present invention into a combined rodent/insect bait station. For example, U.S. Ser. No. 09/012,531 hereby expressly incorporated by reference herein, teaches a combined insect/rodent bait station. Incorporation of the present invention into such a bait station allows the multi-compartment bait station the advantage of being highly resistant to spills or leaks of liquid poison.

With reference to FIG. 5, the insect bait station may be combined with a bait station for rodents in a single, multi-compartment bait station. The insect liquid bait compartment of this unit is similar to the insect bait station shown in FIGS. 1–4.

As shown in FIG. 5, inner container 121 is a inner unit within the multi-compartment bait station. The bottom of inner container 121 may be filled with liquid poison and function as a reservoir. Inner divider 15 is inserted into inner container 121 and functions to prevent spills and leaks of poison as was seen in FIGS. 1–4. On the back side of the multi-compartment bait station is an insect entry platform as seen in FIGS. 1–4. Insects gain access to the bait station through exterior access holes 33. The insects then crawl over lip 35 and onto insect entry platform 29. Once the insects are within chamber 45 the insects may then crawl through interior access holes 37 gaining access to inner container 121. The insects would then crawl over divider 15 and down to the poison, as was seen in FIGS. 1–4. Inner container 121 is covered by lid 123 which is secured by tangs 125. Centrally located on lid 123 is poison refill hole 124. Poison refill hole 124 aligns with hole 61 on outer lid 126 allowing the inner container 121 to be refilled with liquid poison as is necessary. The various means for controlling spilling through this hole as seen in FIGS. 1–4 may be incorporated into this multi-compartment unit as well.

Interior wall 127 separates the insect poison unit on the multi-compartment unit from the rodent bait section on this unit. The rodents gain access to the multi-compartment unit through hole 139 in exterior wall 130. The rodent then may move down corridor 132 into poison containment area 131. The rodent moves over lip 137 to gain access to poison containment area 131. Poison containment area 131 is bound by inner walls 134 and 128. Within poison containment area 131 bracket 135 suspends bar 133. On bar 133 is solid rodent poison 136. Rodents consume this poison. Any poison which crumbles and falls is contained within poison containment area 131 by lip 137.

The multi-compartment unit is sealed by lid 126. This lid encloses the entire multi-compartment unit. Hole 145 on the peripheral edge of lid 126 fits on top of lip 143 such that hole 145 is in alignment with hole 144. A stake may then be driven holes 145 and 144 securing the multi-compartment unit into the ground. Snap closures 142 snap onto brackets 141. This removably attaches lid 126 onto the body of the multi-compartment unit. By removing the stake and unsnapping snap closures 142 the lid 126 may be raised and additional rodent and insect bait may be added to the appropriate places in the multi-compartment unit.

FIG. 6 shows an alternate embodiment to the insect bait station shown in FIG. 1. In this embodiment base 211 contains annular ledge 201. Annular ledge 201 is positioned at the liquid poison fill level. When the insect bait station is assembled tray 231 fits into base 211 such that lip 213 fits on top of ledge 201.

Tray 231 is comprised of three compartments. Solid poison side compartments 215, 223 are separated from liquid poison compartment 219 by side compartments walls 217, 221. Fit into liquid poison compartment 219 is matrix 95. Liquid poison compartment 219 is filled with the liquid insect poison as in FIGS. 1–5. Solid poison side compartments 215, 223 are filled with a solid insect poison. This poison may be either a granular solid poison or a cake of solid poison. The cake may be a gel which prevents desiccation and extends the life of the poison.

After tray 231 is inserted into base 211 on top of tray 231, interior divider 15 is placed on top of tray 231. Annular lip 203 on interior divider 15 fits on top of lip 213. Lip 213 is resting on ledge 201 in base 211. In this way the tray is held at the bottom of base 211 with the interior divider 15 positioned above ledge 201.

On top of base 211 is fit lid 13. Lid 13 may be attached as previously described for the other embodiments. Refill spout 243 positioned on lid 13 allows liquid poison to be poured through refill spout 243 between the domes of divider 15 and onto the matrix 95 in liquid poison compartment 219. Refill spout 243 is shown with a "duck's bill" type shape. This shape acts to prevent liquid from flowing back through the refill spout 243.

FIG. 7 shows another alternate embodiment to the insect bait station shown in FIG. 1. In this embodiment, base 211 again has annular ledge 201 at a liquid fill level. Fit against ledge 201 is lip 213 of tray 231. Within tray 231 is fit matrix 95. The interior of tray 231 forms liquid poison reservoir 233.

As in FIG. 6, divider 15 is fit on top of tray 231 such that annular lip 203 of divider 15 fits over lip 213 of tray 231. Lid 13 fits on top of base 211 sealing the insect bait station. Refill spout 243 allows liquid to be introduced between the domes of interior divider 15 and onto matrix 95 contained within tray 231.

The embodiment shown in FIGS. 6 and 7 allow the poison to be contained within a removable tray. The entire tray may be removed and discarded and a new tray may be added to the insect bait station if desirable. Additionally, the annular ledge 201 and annular lips 213, 203 allow for easier assembly of the insect bait station. In this assembly affixing the components of the insect bait station together by epoxy or ultrasonic welding becomes optional. In FIGS. 6 and 7 the three levels of spilled containment are provided to the insect bait station making the bait station very resistant to spills or leaks as was the case in the previous embodiments.

We claim:

1. An insect bait station comprising:

a station base having a bottom, side walls, and an open top, wherein the side walls proximate to said open top have one or more holes of sufficient width to allow insect entry;

an interior divider fit within the station base, said interior divider having a bottom section forming a liquid tight seal with said base along a midpoint of said base side walls wherein the area of the base below the level of the bottom of the interior divider forms a poison reservoir, and two domes separated by a gap, each dome having an open end facing the bottom of said station base and a closed end proximate to the open top of said station base wherein the area between the domes extending to the level of the bottom section contains one or more holes to allow insect entry; and a lid securely attached to cover the open top of the station base;

wherein the dome volume exceeds the reservoir volume so that a volume displaced from the reservoir if the insect base station were turned on its side will be contained in the dome volume.

2. The insect bait station of claim 1 wherein the lid is removable.

3. The insect bait station of claim 1 wherein the lid is hinged.

4. The insect bait station of claim 1 wherein the lid is removably attached to the base by an attachment means.

5. The insect bait station of claim 1 wherein the lid has a hole for refilling the bait station with liquid.

6. The insect bait station of claim 5 wherein the hole for refilling the bait station has a means for allowing entry of liquid but preventing exit of liquid through the hole.

7. The insect bait station of claim 1 wherein the domes of the interior divider are separated from the walls of the station base except at the bottom of the interior divider.

8. The insect bait station of claim 1 further comprising an insect entry port extending from at least one side of the base enclosing said one or more holes of sufficient width to allow insect entry, said insect entry port having one or more insect entry openings oriented substantially perpendicular to said one or more holes of sufficient width to allow insect entry.

9. The insect bait station of claim 8 further comprising an annular lip positioned about the insect entry openings of the insect entry port.

10. The insect bait station of claim 1, wherein a section of the side of the base portion is made of a transparent material such that the poison reservoir can be visually monitored.

11. The insect bait station of claim 1 wherein the lid and the base each have mating holes whereby a stake may be driven through said holes.

12. The bait station of claim 11 wherein the container can be securely affixed to the ground.

13. The insect bait station of claim 1 further comprising a matrix of slightly smaller dimensions than the poison reservoir inserted into the poison reservoir.

14. The insect bait station of claim 13 wherein the matrix is a labyrinth of interconnecting passageways which allow the insect to move to the area of the reservoir containing the liquid poison.

15. The insect bait station of claim 13 wherein the matrix includes a wicking material that draws liquid poison to an emanating surface area.

16. The bait station of claim 13 wherein the matrix is coated with an anti-microbial compound.

17. The insect bait station of claim 1 further comprising a tray set inside said bait station base, said tray positioned below said interior divider, wherein said tray forms a reservoir for containing liquid poison.

18. The bait station of claim 17 further comprising a matrix for containing liquid poison contained within the reservoir on said tray.

19. The bait station of claim 18 wherein the tray is divided into at least two compartments, wherein at least one compartment contains a matrix which could be filled with a liquid poison and at least one compartment does not contain a matrix.

20. The bait station of claim 19 wherein at least one of the compartments containing the matrix is positioned below the gap between said domes of said divider.

21. The bait station of claim 1 wherein said base is a contiguous part of a multi-compartment bait station, wherein one part of said multi-compartment bait station is a bate station for control of rodent pests.

22. The bait station of claim 21 wherein said multi-compartment bait station has a separate entry hole for rodents and insects, with the area containing rodent and the area containing insects separated by interior multi-compartment bait station walls.

23. The bait station of claim 1 wherein some interior surface area of said bait station is coated with an anti-microbial compound.

24. An insect bait station, including a liquid poison containing reservoir contained within a housing, the housing having at least one insect entry hole, the improvement comprising, an interior divider contained within the housing above the reservoir, the divider enclosing an area above the reservoir in a plurality of enclosures such that the divider would retain the liquid in the enclosures when the bait station is inverted and the divider would retain in said enclosures, the liquid displaced from the reservoir when the bait station is turned on its side.

25. The insect bait station of claim 24 wherein the housing is comprised of a base section and a lid affixed over an open end of said base section.

26. The insect bait station of claim 25 wherein the lid is attached to the base section by a hinge.

27. The insect bait station of claim 25 wherein the housing has an entry port in fluid communication with the fluid reservoir wherein a device may be inserted into said port to add liquid to said reservoir.

28. The insect bait station of claim 27 wherein the entry port restricts flow of fluid from the housing to the area exterior to the housing.

29. The insect bait station of claim 25 further comprising a porous matrix contained with said reservoir.

30. The insect bait station of claim 29 wherein said matrix is a labyrinth of interconnecting passageways which allow the insect to move to the area of the reservoir containing the liquid poison.

31. The insect bait station of claim 25 further comprising a stake extending through a stake receiving hole on said housing, said stake sufficiently long to secure said insect bait station into the ground.

32. The insect bait station of claim 25 wherein said housing has a transparent section such that the level of liquid within the reservoir may be visually monitored.

33. The insect bait station of claim 25 wherein said at least one insect entry hole is contained within an insect entry chamber, said insect entry chamber having a secondary at least one insect entry hole allowing entry into the insect entry chamber, said insect entry chamber providing secondary liquid poison spill containment.

34. The insect bait station of claim 33 wherein said secondary at least one insect entry hole has a raised lip surrounding the periphery of said hole, said raised lip providing tertiary liquid poison spill containment.

* * * * *